(12) United States Patent
Nagata et al.

(10) Patent No.: US 10,680,318 B2
(45) Date of Patent: Jun. 9, 2020

(54) ANTENNA APPARATUS

(71) Applicants: FURUKAWA ELECTRIC CO., LTD., Tokyo (JP); FURUKAWA AUTOMOTIVE SYSTEMS INC., Shiga (JP)

(72) Inventors: Masayuki Nagata, Tokyo (JP); Daisuke Inoue, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 410 days.

(21) Appl. No.: 15/681,209

(22) Filed: Aug. 18, 2017

(65) Prior Publication Data

US 2017/0346177 A1 Nov. 30, 2017

Related U.S. Application Data

(63) Continuation of application No. PCT/JP2016/055751, filed on Feb. 26, 2016.

(30) Foreign Application Priority Data

Feb. 27, 2015 (JP) .................................. 2015-037828

(51) Int. Cl.
*H01Q 1/42* (2006.01)
*H01Q 19/06* (2006.01)
(Continued)

(52) U.S. Cl.
CPC .................. *H01Q 1/42* (2013.01); *G01S 7/03* (2013.01); *G01S 13/931* (2013.01); *H01Q 1/325* (2013.01);
(Continued)

(58) Field of Classification Search
CPC ...... H01Q 1/3233; H01Q 1/3283; H01Q 1/42; H01Q 21/065; G01S 13/931
See application file for complete search history.

(56) References Cited

U.S. PATENT DOCUMENTS 5,955,752 A * 9/1999 Fukaya .................. G01S 7/032
257/275
6,573,860 B1 6/2003 Winter et al.
(Continued)

FOREIGN PATENT DOCUMENTS

CN 101512833 A 8/2009
CN 202172122 U 3/2012
(Continued)

OTHER PUBLICATIONS

Extended European search report dated Oct. 1, 2018 for European patent application No. 16755671.1, which is the basic application of PCT/JP2016/055751.
(Continued)

*Primary Examiner* — Ab Salam Alkassim, Jr.
(74) *Attorney, Agent, or Firm* — Yoshida & Associates LLC; Ken I Yoshida

(57) ABSTRACT

Provided is an antenna apparatus which is capable of improving a gain in a specific direction, reducing an unnecessary gain in an angle range, and reducing its height. A radome 220 is formed such that a central portion positioned above a patch array antenna 130 is formed in different shapes in an outer wall and an inner wall. The central portion of the outer wall of the radome 220 is formed in a flat shape, and thus the height of the radome 120 is reduced. On the other hand, the center portion of the inner wall of the radome 220 is formed such that a radome thickness at a position of the radome 220 in directions in which an angle θ is about
(Continued)

−45° and about +45° when viewed from the center of the patch array antenna 130 changes stepwise.

9 Claims, 12 Drawing Sheets

(51) Int. Cl.
  *H01Q 1/32* (2006.01)
  *H01Q 15/08* (2006.01)
  *G01S 13/931* (2020.01)
  *H01Q 21/06* (2006.01)
  *H01Q 1/52* (2006.01)
  *G01S 7/03* (2006.01)
  *G01S 7/02* (2006.01)

(52) U.S. Cl.
  CPC ......... *H01Q 1/3233* (2013.01); *H01Q 1/3258* (2013.01); *H01Q 1/525* (2013.01); *H01Q 15/08* (2013.01); *H01Q 19/06* (2013.01); *H01Q 21/065* (2013.01); *G01S 2007/028* (2013.01); *G01S 2013/93274* (2020.01)

(56) References Cited

U.S. PATENT DOCUMENTS

| | | | |
|---|---|---|---|
| 6,674,392 B1* | 1/2004 | Schmidt | G01S 13/931 342/70 |
| 9,583,817 B2* | 2/2017 | Watanabe | H01Q 1/24 |
| 10,367,258 B2* | 7/2019 | Tagi | H01Q 15/02 |
| 2004/0066346 A1* | 4/2004 | Huor | H01Q 21/005 343/770 |
| 2010/0019978 A1 | 1/2010 | Okada et al. | |
| 2010/0039346 A1* | 2/2010 | Peter | H01Q 1/40 343/872 |
| 2010/0271278 A1* | 10/2010 | Binzer | H01Q 19/062 343/824 |
| 2011/0248902 A1* | 10/2011 | Miyagawa | H01Q 1/42 343/872 |
| 2012/0044113 A1* | 2/2012 | Satoh | H01Q 1/06 343/702 |
| 2012/0326939 A1 | 12/2012 | Cannon et al. | |
| 2013/0229299 A1 | 9/2013 | Matsuzawa et al. | |
| 2014/0091969 A1* | 4/2014 | Shi | G01S 7/03 342/385 |
| 2015/0249283 A1 | 9/2015 | Watanabe et al. | |
| 2015/0378006 A1* | 12/2015 | Ishida | H01Q 17/00 342/175 |
| 2017/0352950 A1* | 12/2017 | Sakurai | G01S 13/931 |
| 2018/0013196 A1* | 1/2018 | Sakurai | G01S 7/02 |
| 2018/0233812 A1* | 8/2018 | Kim | G01S 7/03 |
| 2019/0089052 A1* | 3/2019 | Yong | H01Q 3/34 |

FOREIGN PATENT DOCUMENTS

| | | |
|---|---|---|
| CN | 103004017 A | 3/2013 |
| DE | 4412770 A1 | 10/1995 |
| EP | 0 884 799 A2 | 6/1998 |
| JP | 2000101336 A | 4/2000 |
| JP | 2000174543 A | 6/2000 |
| JP | 2006105866 A | 4/2006 |
| JP | 2006-140956 A | 6/2006 |
| JP | 2006145399 A | 6/2006 |
| JP | 2007-201868 A | 8/2007 |
| JP | 2009-278501 A | 11/2009 |
| JP | 2013110503 A | 6/2013 |
| JP | 2015-008410 A | 1/2015 |
| WO | 2001047062 A1 | 6/2001 |
| WO | 2012133210 A1 | 10/2012 |

OTHER PUBLICATIONS

International Search Report for PCT/JP2016/055751, dated May 10, 2016.

Office Action dated Oct. 9, 2019 for Chinese patent application No. 201680004004.4, which corresponds to this U.S. Appl. No. 15/681,209 With Unedited computer generated English translation.

Office Action dated Aug. 9, 2019 for Japanese patent application No. 2017-502500, which corresponds to this U.S. Appl. No. 15/681,209 With Unedited computer generated English translation.

* cited by examiner

VEHICLE FRONT DIRECTION

ANTENNA APPARATUS

TECHNICAL FIELD

The present invention relates to an antenna apparatus installed on a vehicle, and more particularly, to an antenna apparatus having a radome suitable for implementation of a predetermined directivity.

BACKGROUND ART

In recent years, for example, techniques such as cross traffic alert (CTA) and lane change aid (LCA) have been developed as a technique for supporting driving of cars. In these systems, a technique of detecting obstacles in surroundings areas using a radar is employed. The radar radiates a radio wave in a predetermined direction, and when the radio wave is reflected by an obstacle, the obstacle is detected by receiving and processing the reflected wave. To this end, the radar includes a transmitting antenna that radiates a radio wave and a receiving antenna that receives a reflected wave.

For example, as illustrated in FIG. 2, in-vehicle radar antennas used for detecting an obstacle are installed at four corners of a vehicle 10, and each antenna is installed to detect an obstacle in a predetermined range around the vehicle. In order to detect an obstacle around the vehicle with a high degree of accuracy through the radar, it is desirable that the antenna installed on the radar have a wide directivity in a horizontal direction and a narrow directivity in a vertical direction in order to suppress unnecessary radio waves. For example, an antenna 91 installed on a front left corner of the vehicle 10 illustrated in FIG. 2 is installed such that an antenna surface is erected vertically, and a vertical direction (radiation direction) of the antenna surface has an angle of 45° from a vehicle front side on a horizontal plane and an angle of 45° from a vehicle left side as indicated by an arrow in FIG. 2).

The in-vehicle radar antenna 91 illustrated in FIG. 2 has a directivity of a range of about ±60° on the horizontal plane in order to detect obstacles around the vehicle, but it is desirable that the in-vehicle radar antenna 91 has a directivity in which a gain is high, particularly, in a vehicle front direction of −45° and a vehicle left direction of +45°. It is desirable that the antennas at the other three corners have a similar directivity.

In order to control the directivity of the antenna, a method of using a shape of a radome covering the antenna is known. For example, Patent Document 1 discloses a microwave antenna in which a directivity of a wide angle is obtained by installing an opening or a thin surface portion having a predetermined shape in a dielectric covering a front surface of an antenna opening and forming an outer corner of an antenna opening end side edge portion on a curved surface. Further, it is stated that beam control can be performed by changing conditions such as a shape, an arrangement, and the like of the dielectric.

Further, Patent Document 2 discloses a wide coverage radar apparatus in which a radome having a transmitting antenna and a receiving antenna accommodated therein reduces influence on a radiation characteristic of each antenna. It is stated that it is possible to reduce the influence of the radome by adjusting a thickness and a radius of curvature of a corner portion of the radome. Further, it is stated that it is possible to implement a wide angle of directivity of each antenna and improving isolation between both antennas by adjusting the thickness of the radome between the transmitting antenna and the receiving antenna. For example, it is stated that it is possible to improve a characteristic by reducing the thickness of the radome.

CITATION LIST

Patent Document

Patent Document 1: JP 2013-110503 A
Patent Document 2: WO 2012/133210

SUMMARY OF THE INVENTION

Problem to be Solved by the Invention

On the other hand, as a method of implementing a directivity in which a gain outside a range in which a high gain is necessary is suppressed, for example, a method of implementing a sharp directivity in a narrow angle range by causing the radome to have a convex lens shape has been known from the past. Also in Patent Document 1, it is stated that the radome is formed in a convex lens shape in order to narrow a directivity in an orthogonal direction in which an angle is not widened. However, when the radome has the convex lens shape, the thickness of the radome is increased, and a height of an antenna apparatus is increased, and thus there is a problem in that it is difficult to implement a small-sized (compact) antenna apparatus.

Further, in Patent Document 2, a means for increasing an angle range in which a high gain is obtained and improving the isolation between the transmitting antenna and the receiving antenna is stated, but a method of increasing a gain in a specific direction and suppressing a gain outside a desired angle range is not stated.

The invention was made to solve the above problems, and it is an object of the invention to provide an antenna apparatus which is capable of improving a gain in a specific direction, reducing an unnecessary gain in an angle range, and reducing its height.

Means for Solving Problem

A first aspect of an antenna apparatus of the invention includes a circuit substrate, a patch array antenna including an element array and having a free space wavelength of λ, the element array including a line of two or more patch antenna elements arranged on the circuit substrate, and a radome configured to accommodate the patch array antenna, wherein, when a plane passing through a center of the patch array antenna and being parallel to the element array and vertical to the circuit substrate is a radiation vertical surface, and an inner wall of the radome is formed to include a region in which a radome thickness in a range in which an angle with respect to a radiation vertical surface when viewed from a center of the patch array antenna is larger than −50° and smaller than +50° is smaller than a radome thickness at a position of ±50°.

A first aspect of an antenna apparatus of the invention includes a circuit substrate, a patch array antenna including an element array and having a free space wave-length of A, the element array including a line of two or more patch antenna elements arranged on the circuit substrate, and a radome configured to accommodate the patch array antenna, wherein, when a plane passing through a center of each of the patch antenna elements of the patch array antenna and vertical to the circuit substrate is a radiation vertical surface, and an inner wall of the radome is formed to include a region in which a radome thickness in a range in which an angle with respect to a radiation vertical surface when viewed from a center of the patch array antenna is larger than −50° and smaller than +50° is smaller than a radome thickness at a position of ±50°.

In another aspect of the antenna apparatus of the invention, the inner wall of the radome is formed such that a region from a position intersecting with the radiation vertical surface to a position at which an angle with respect to the radiation vertical surface is ±50° is a curved surface being convex toward the patch array antenna side.

In another aspect of the antenna apparatus of the invention, the radome is formed such that an end portion is vertical to the circuit substrate, and a distance from a center of the patch array antenna to a center of the end portion in a thickness direction is 0.85λ or more and 1.15λ or less.

In another aspect of the antenna apparatus of the invention, the patch array antenna includes a transmitting antenna having a line of element arrays and a receiving antenna having one or more lines of element arrays, an integrated transceiving radome including a transmitting antenna side radome portion configured to accommodate the transmitting antenna, a receiving antenna side radome portion configured to accommodate the receiving antenna, and a connecting portion connecting the transmitting antenna side radome portion with the receiving antenna side radome portion is provided, the transmitting antenna side radome portion is configured with the radome, and an interval of λ/8 or more is formed between the connecting portion and the circuit substrate.

In another aspect of the antenna apparatus of the invention, when a thickness of the receiving antenna side radome portion is a reference radome thickness, the connecting portion has a thickness of ⅔ or less of the reference radome thickness.

Effect of the Invention

According to the invention, it is possible to provide an antenna apparatus which is capable of improving a gain in a specific direction, reducing an unnecessary gain in an angle range, and reducing its height.

MODE(S) FOR CARRYING OUT THE INVENTION

Figure 1A:
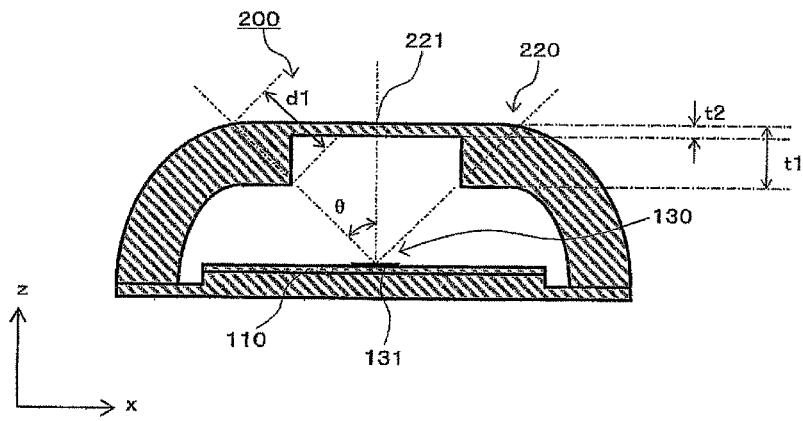
FIG. 1A is a cross-sectional view and FIG. 1B is a plane view both illustrating a configuration of an antenna apparatus according to a first embodiment of the invention.

Hereinafter, antenna apparatuses according to exemplary embodiments of the invention will be described in detail with reference to the appended drawings. Parts having the same functions are denoted by the same reference numerals for the sake of simplification of illustration and description.

First Embodiment

Figure 1B:
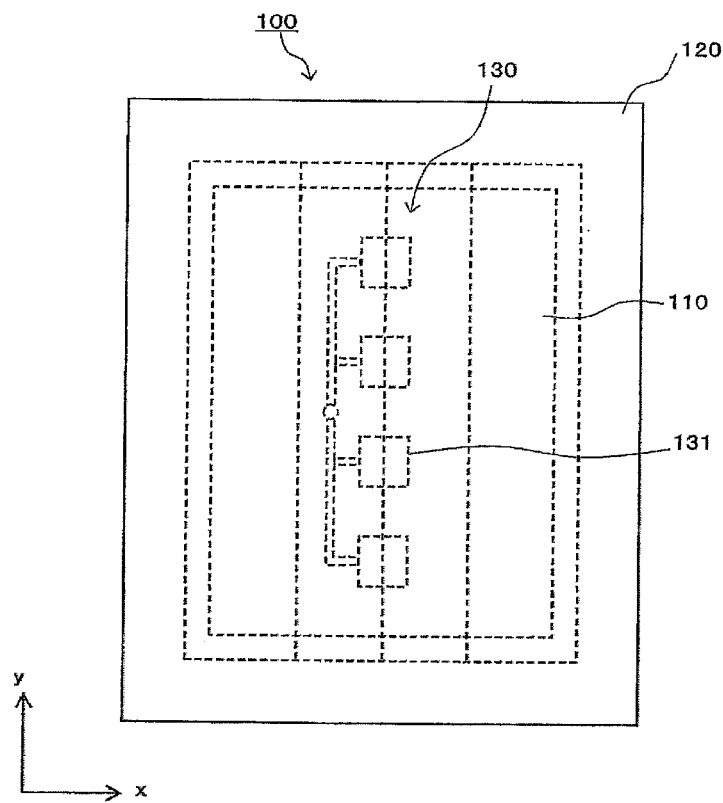

The antenna apparatus according to the first embodiment of the invention will be described with reference to FIGS. 1A and 1B. FIG. 1A is a cross-sectional view of an antenna apparatus 200 according to the present embodiment, and FIG. 1B is a plane view. The antenna apparatus 200 includes a circuit substrate 110, a patch array antenna 130 arranged on the circuit substrate 110, and a radome 220 in which the circuit substrate 110 and the patch array antenna 130 are accommodated. The patch array antenna 130 includes an element array in which a line of two or more patch antenna elements 131 are arranged on one side of a circuit substrate 110. The patch array antenna 130 can be used as a transmitting antenna for emitting a radio wave or can be used as a receiving antenna for receiving a radio wave from the outside.

The patch array antenna 130 is formed such that the two or more patch antenna elements 131 are arranged in a y direction illustrated in FIGS. 1A and 1B, so that the patch array antenna 130 narrows a directivity in the y direction. When the antenna apparatus 200 is installed on the vehicle, the antenna apparatus 200 is attached to the vehicle so that the y-axis is vertical, and an xz-plane is horizontal. Accordingly, the antenna apparatus 200 can have a narrow directivity in the vertical direction. The cross-sectional view illustrated in FIG. 1A is a cross-sectional view when the antenna apparatus 200 is cut along the xz plane passing through any one patch antenna element 131 of the patch array antenna 130. A method of forming the radome in the convex lens shape is considered as a means of narrowing the directivity in the y direction, but the thickness of the radome is increased, leading to an antenna apparatus with a high height, and thus it is difficult to implement a small-sized (compact) antenna apparatus.

Hereinafter, in the cross-sectional view illustrated in FIG. 1A, a direction vertical to the circuit substrate 110 from the center of the patch array antenna 130 is referred to as a "radiation direction." Further, an angle from the radiation direction when viewed from the center of the patch array antenna 130 is indicated by θ. Furthermore, a distance from an inner wall to an outer wall of the radome 220 when viewed from the center of the patch array antenna 130 is referred to as a "passage path length." In the cross-sectional view illustrated in FIG. 1A, the radiation direction is a vertical line passing through the center of the patch array antenna 130, but in practice, the radiation direction is a vertical surface that passes through the center of the patch array antenna 130 and is parallel to an element array (a radiation vertical surface).

Figure 2:
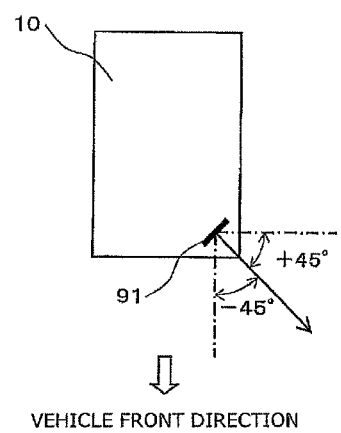
FIG. 2 is a schematic diagram illustrating an installation example of an in-vehicle radar antenna.

As the patch array antenna 130, for example, an antenna having a directivity of about ±60° from the radiation direction can be used, but in the antenna apparatus 200 of the present embodiment, a shape of the radome 220 is decided so that a directivity capable of obtaining a high gain particularly in a predetermined direction in a horizontal direction is implemented. As the predetermined direction in which a high gain is necessary, there are a direction of −45° and a direction of +45° illustrated in FIG. 2. The radome 220 of the present embodiment formed so that a high gain is obtained in the directions in which the angle θ is −45° and +45° will be described in detail below.

In the antenna apparatus 200 illustrated in FIG. 1A, the inner wall is formed such that a radome thickness of the radome 220 changes stepwise at a position of the angle θ when viewed from the center of the patch array antenna 130. A radome thickness t2 on a center side further than a position at which the radome thickness changes stepwise is small, and a radome thickness t1 on an outer side than the position is large.

Figure 3:
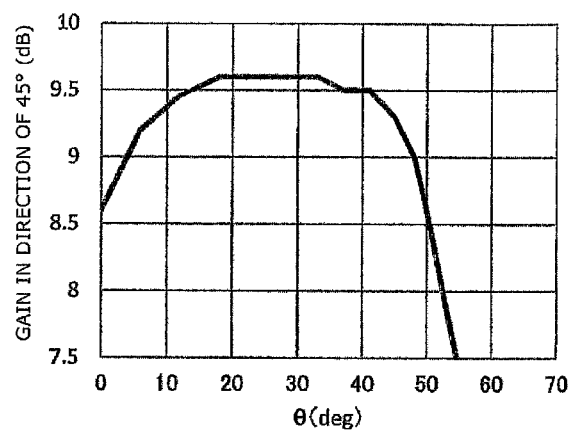
FIG. 3 is a graph illustrating a change in a gain in a direction in which an angle θ is ±45° with respect to an angle viewed from an antenna center of the antenna apparatus according to the first embodiment.

How the radome 220 formed as described above affects the gain of the patch array antenna 130 will be described with reference to FIG. 3. FIG. 3 illustrates a change in a gain in a direction in which the angle θ of the patch array antenna 130 is ±45° direction when the angle θ is changed. As can be seen from FIG. 3, a relatively high gain is obtained while the angle θ is between 0 and 50°, and when the angle θ exceeds 50°, the gain sharply decreases. In FIG. 3, the change in the gain when angle θ is on the positive side is illustrated, but a similar change is shown when the angle θ is on the negative side. Therefore, in the antenna apparatus 200 of the present embodiment equipped with the radome 220 having the shape illustrated in FIG. 1, it is understood that a high gain is obtained in a range in which the angle θ is −50° to +50°. Further, as illustrated in FIG. 3, it is possible to reduce an unnecessary gain in a wide angle exceeding, for example, ±60°.

Second and Third Embodiments

Figure 4A:
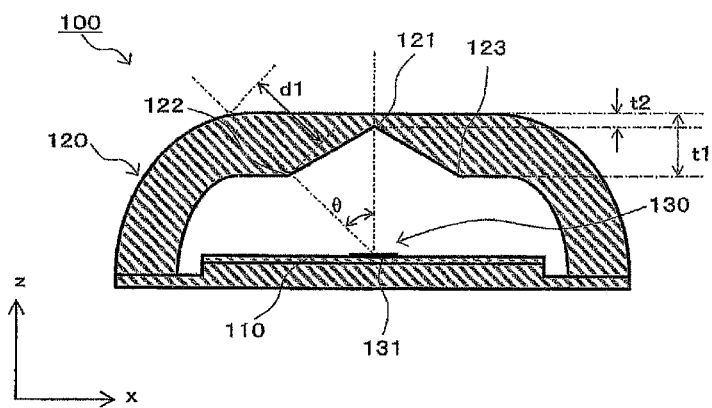
FIG. 4A is a cross-sectional view illustrating a configuration of an antenna apparatus according to a second embodiment of the invention and FIG. 4B is a cross-sectional view illustrating a configuration of an antenna apparatus according to a third embodiment of the invention.
Figure 4B:
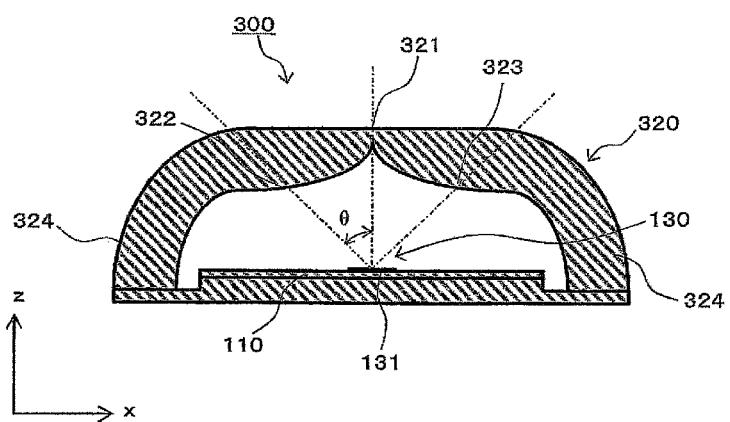

Similarly to the radome 220, FIGS. 4A and 4B illustrate an antenna apparatus including another radome which is formed so that a high gain is obtained in the directions in which the angle θ viewed from the center of the patch array antenna 130 is −45° and +45°. FIG. 4A illustrates a cross-sectional view of an antenna apparatus 100 according to a second embodiment, and FIG. 4B illustrates a cross-sectional view of an antenna apparatus 300 according to a third embodiment. Each of a radome 120 of the antenna apparatus 100 and a radome 320 of the antenna apparatus 300 is formed so that the passage path length is large in a range of ±5° with respect to the direction in which the angle θ is −45° and +45°, and a passage path length in the radiation direction is shortest.

In the radome 120 illustrated in FIG. 4A, a central portion positioned above the patch array antenna 130 is formed to have different shapes in an outer wall and an inner wall. The central portion of the outer wall of the radome 120 is formed in a flat shape. On the other hand, the central portion of the inner wall of the radome 120 is formed in a characteristic shape to increase a gain in a predetermined direction. The inner wall of the radome 120 is formed so that a radome thickness t1 is large in a range of an angle larger than the angle θ from the center of the patch antenna element 131 and decreases as it gets closer to the center of the inner wall (a position of the inner wall intersecting with the radiation direction), and a radome thickness t2 in the vertical direction at the center of the patch antenna element 131 is smallest.

Figure 5:
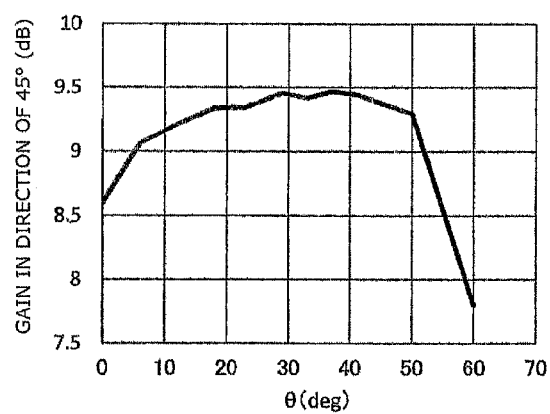
FIG. 5 is a graph illustrating a change in a gain in a direction in which an angle θ is ±45° with respect to an angle viewed from an antenna center of the antenna apparatus according to the second embodiment.

FIG. 5 illustrates the gain of the patch array antenna 130 including the radome 120 of the present embodiment. FIG. 5 illustrates a change in the gain in the direction in which the angle θ of the patch array antenna 130 is ±45° when the angle θ is changed. In the present embodiment, a change similar to that of the first embodiment is shown, and the gain increases until the angle θ becomes 50°, and when the angle θ exceeds 50°, the gain sharply decreases.

In the antenna apparatus 300 illustrated in FIG. 4B, the inner wall of the radome 320 is formed in a curved shape from the center of the inner wall to the position in the directions in which the angle θ is −50° and +50°. The curved shape is a curved line that is convex toward the patch array antenna 130 side at the cross-sectional view, and in practice, the curved shape is a curved surface spreading in the direction of the element array. In the radome 320 of the present embodiment, similarly to the radome 120 of the second embodiment, the passage path length gently changes in the range of ±5° with respect to the directions in which the angle θ is −45° and +45°, and the passage path length does not change greatly as in the radome 220 of the first embodiment.

Figure 6:
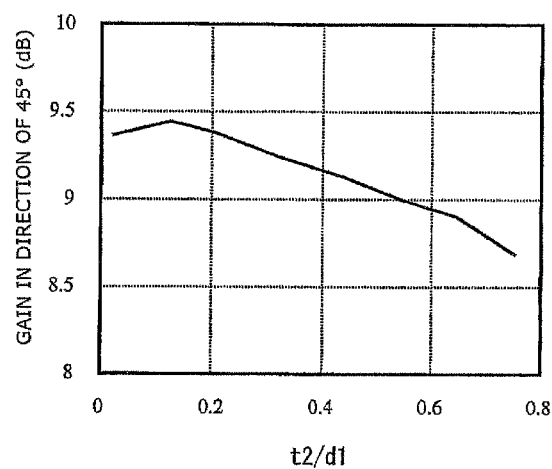
FIG. 6 is a graph illustrating a change in a gain with respect to a radome thickness in a radiation direction of the antenna apparatus according to the second embodiment.

FIG. 6 illustrates a change in the gain of the patch array antenna 130 when a passage path length d1 in the direction of ±45° when viewed from the center of the patch array antenna 130 is set to be constant, and the passage path length t2 in the radiation direction is changed in the antenna apparatus 100 of the second embodiment. A horizontal axis illustrated in FIG. 6 indicates a ratio of the passage path length t2 in the radiation direction to the passage path length d1 in the direction of ±45°, and a vertical axis indicates the gain in the direction of 45° when viewed from the center of the patch array antenna 130. As can be seen from FIG. 6, the gain in the direction of 45° increases as the passage path length t2 in the radiation direction decreases. In FIG. 5, the change in the gain of the antenna apparatus 100 of the second embodiment is illustrated, but the antenna apparatus 300 of the third embodiment shows a similar gain change. As can be seen from FIG. 6 that when the passage path length in the directions of −45° and +45° when viewed from the center of the patch array antenna 130 is increased, and the passage path length of the radiation direction is decreased, it is possible to obtain the high gain in the direction of ±45°. The same applies to the antenna apparatus 300 of the third embodiment.

Figure 7:
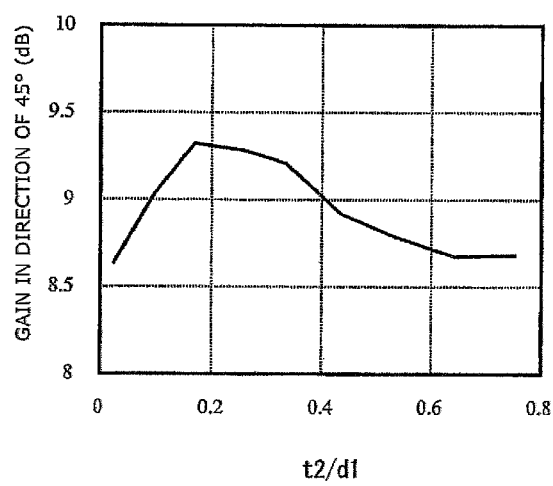
FIG. 7 is a graph illustrating a change in a gain with respect to a radome thickness in a radiation direction of the antenna apparatus according to the first embodiment.

FIG. 7 illustrates a change in the gain of the patch array antenna 130 when a passage path length d1 in the direction of ±45° when viewed from the center of the patch array antenna 130 is set to be constant, and the passage path length t2 in the radiation direction is changed in the antenna apparatus 200 of the first embodiment. Here, a horizontal axis indicates a ratio of the passage path length t2 in the radiation direction to the passage path length d1 in the direction of ±45°, and a vertical axis indicates the gain in the direction of 45° when viewed from the center of the patch array antenna 130. As can be seen from FIG. 7, the gain in the direction of 45° increases as the passage path length in the radiation direction decreases, but when the passage path length in the radiation direction is further decreased, the gain abruptly decreases. Therefore, when the radome thickness in the radiation direction is small, the gain may change greatly with a slight change caused by a variation in the radome thickness or the like.

Accordingly, in order to obtain the high gain in the direction of ±45° from the center of the patch array antenna 130, it is desirable to reduce the radome thickness in the radiation direction so that the passage path length of the radiation direction is decreased. However, when the radome 220 of the first embodiment is used, if the radome thickness is small, the gain may change greatly with a slight change in the radome thickness. Since the radome thickness in the radiation direction is relatively thin, that is, about 1 mm, it is desirable that the gain hardly change even when there is a variation in the thickness. Therefore, it is more desirable to use the radome 120 of the second embodiment or the radome 320 in the third embodiment rather than the radome 220 of the first embodiment.

Figure 8:
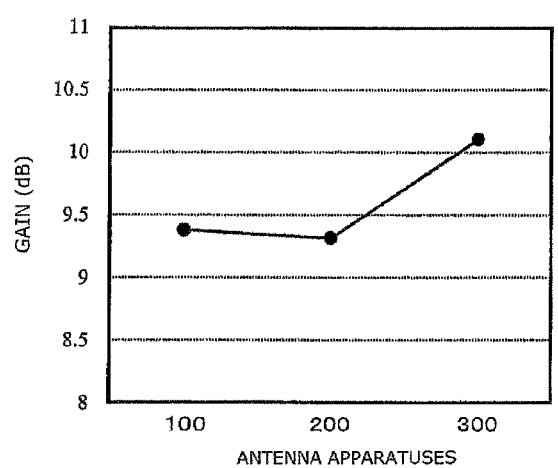
FIG. 8 is a graph illustrating a comparison of gains of the antenna apparatuses according to the first to third embodiments.

A difference in the gain in the direction of ±45° occurring depending on the shapes of the radomes 220, 120, and 320 of the antenna apparatus 200, 100, and 300 according to the first to third embodiments will be described with reference to FIG. 8. FIG. 8 is a diagram illustrating a comparison of the gains in the direction of 45° when t2/d1 is 0.21 in the antenna apparatuses 100, 200, and 300 according to the embodiments. As illustrated in FIG. 8, there is little difference in the gain in the direction of 45° between the antenna apparatus 200 of the first embodiment and the antenna apparatus 100 of the second embodiment. On the other hand, the antenna apparatus 300 of the third embodiment has a higher gain than the antenna apparatuses 100 and 200. In FIG. 8, only the gains in the direction of +45° are compared, but the same applies to a comparison of the gains in the direction of −45°.

Accordingly, when the passage path length in the radiation direction is small, there is an advantage in that the change in the gain with respect to the variation in the radome thickness is small in the antenna apparatus 100 of the second embodiment and the antenna apparatus 300 of the third embodiment. Further, the antenna apparatus 300 of the third embodiment is highest in the gain in the direction of ±45°. Accordingly, the shape of the radome 320 of the third embodiment of the antenna apparatus 300 is most preferable in terms of an improvement in the gain in the direction of ±45°.

According to the antenna apparatuses 100, 200, and 300 of the present embodiment, the inner wall of the radome is formed so that a region in which the radome thickness in the range in which the angle θ viewed from the center of the patch array antenna 13 is larger than −50° and smaller than +50° is smaller than the radome thickness at the position of ±50°, and thus it is possible to reduce the unnecessary gain in the wide angle direction while improving the gain in the direction of ±45° and reduce the height.

Fourth Embodiment

Figure 9:
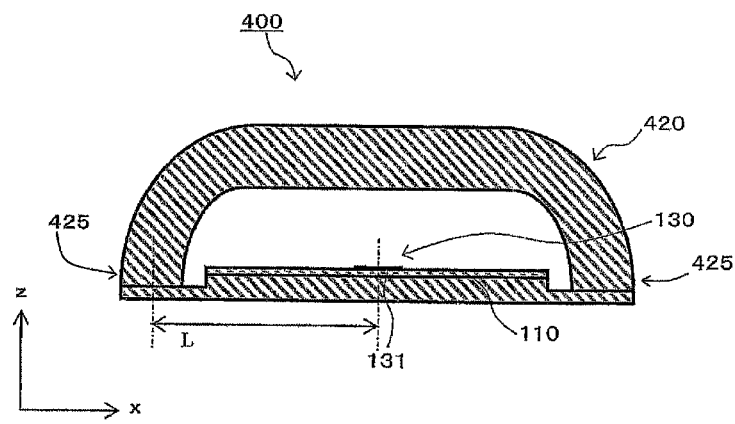
FIG. 9 is a cross-sectional view illustrating a configuration of an antenna apparatus according to a fourth embodiment of the invention.
Figure 10:
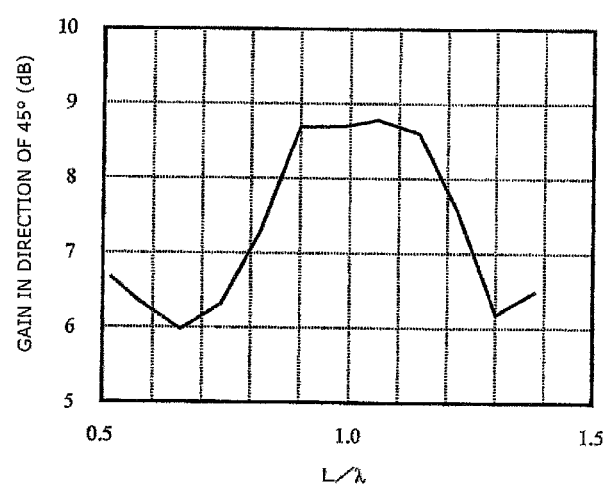
FIG. 10 is a graph illustrating a change in a gain with respect to a distance between a radome end portion and an antenna in the antenna apparatus according to the fourth embodiment.

An antenna apparatus according to the fourth embodiment of the invention will be described with reference to FIG. 9. FIG. 9 is a cross-sectional view when an antenna apparatus 400 of the present embodiment is cut along the xz plane passing through the patch antenna element 131. In the antenna apparatus 400 of the present embodiment, an end portion 425 of a radome 420 is vertical to the circuit substrate 110 and further formed so as to satisfy the following conditions. In FIG. 9, a distance from the center of the patch array antenna 130 to the center of the end portion 425 of the radome 420 in the thickness direction is indicated by L. FIG. 10 illustrates a result of obtaining how the gain in the direction of 45° viewed from the center of the patch array antenna 130 is changed with the distance L. Here, a free space wavelength of a radio wave radiated from the patch array antenna 130 is indicated by λ, and a result of normalizing the distance L using the wavelength λ is a horizontal axis in FIG. 10.

As can be seen from FIG. 10, the gain in the direction of 45° from the center of the patch antenna element 131 is highest when the distance L is substantially equal to the wavelength λ (L/λ≈1), and the high gain is obtained in a range of L=0.85λ to 1.15λ. In FIG. 10, the change in the gain in the direction of +45° is illustrated, but the same characteristic is obtained in the case of −45°. Accordingly, when the radome 420 is formed so that the distance L from the center of the patch array antenna 130 to the center of the end portion 425 of the radome 420 in the thickness direction is in the range of 0.85λ to 1.15λ, it is possible to obtain the high gain in the direction of 45° when viewed from the center of the patch array antenna 130.

In FIG. 9, the radome 420 has a uniform thickness, and a region having different thicknesses is not formed even in the central portion of the radome 420 positioned above the patch array antenna 130. In this case, the distance L from the center of the patch antenna element 131 to the center of the end portion 425 of the radome 420 in the thickness direction satisfies the above conditions, and thus it is possible to obtain the high gain in the direction of ±45°. In addition, the inner wall of the central portion of the radome 420 has a similar shape as that of any one of the radomes 220, 120, and 320 of the first to third embodiments, it is possible to obtain a higher gain in the direction of ±45°.

Hereinafter, in the cross-sectional view illustrated in FIG. 1A, a direction vertical to the circuit substrate 110 from the center of the patch array antenna 130 is referred to as a "radiation direction." Further, an angle from the radiation direction when viewed from the center of the patch array antenna 130 is indicated by 8. Furthermore, a distance from an inner wall to an outer wall of the radome 220 when viewed from the center of the patch array antenna 130 is referred to as a "passage path length." In the cross-sectional view illustrated in FIG. 1A, the radiation direction is a vertical line passing through the center of the patch array antenna 130, but in practice, the radiation direction is a vertical surface that passes through the center of each of the patch antenna elements of the patch array antenna 130 (a radiation vertical surface).

Figure 12A:
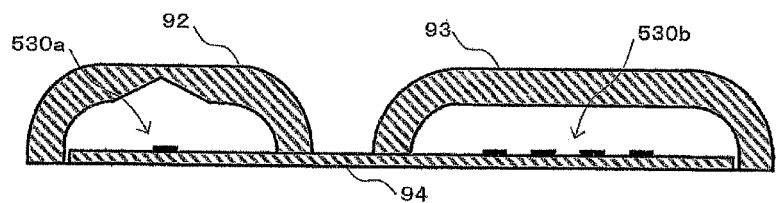
FIG. 12A and FIG. 12C are cross-sectional view s illustrating examples of radomes of integrated transceiving antennas and FIG. 12B is a cross-sectional view illustrating an example of the radome of a prior art used for the integrated transceiving antenna.

In the integrated transceiving antenna, it is necessary to increase a distance between the transmitting antenna 530*a* and the receiving antenna 530*b* to some extent in order to prevent the receiving antenna 530*b* from directly receiving a radio wave radiated from the transmitting antenna 530*a*. To this end, when any one of the radomes 220, 120, 320, and 420 of the first to fourth embodiments is applied so that at least one of the transmitting antenna 530*a* and the receiving antenna 530*b* has a high gain in the direction of ±45° when viewed from the antenna center, a radome 92 covering the transmitting antenna 530*a* and a radome 93 covering the receiving antenna 530*b* are separately installed, as illustrated in FIG. 12A. Thus, a portion of a circuit substrate 94 between the radome 92 and the radome 93 is exposed.

Figure 12B:
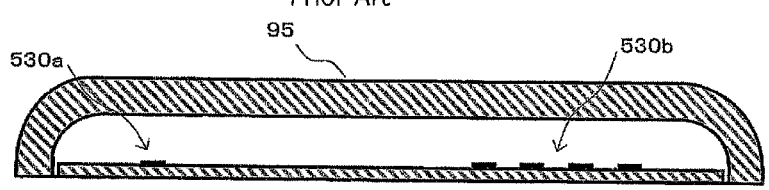
Figure 12C:
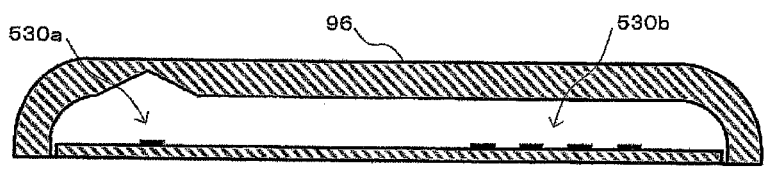

An integrated transceiving radome of a related art used for the integrated transceiving antenna had a shape in which the transmitting antenna 530*a* and the receiving antenna 530*b* are covered integrally as illustrated in FIG. 12B. In an integrated transceiving radome 95 of a related art, a shape of an inner wall above the antennas 530*a* and 530*b* is formed to be flat, and thus the high gain is not obtained in the direction of ±45° when viewed from the center of each antenna. In this regard, in order to increase the gain of the transmitting antenna 530*a* in the direction of ±45°, for example, an integrated transceiving radome 96 in which the same shape as the radome 120 of the second embodiment is formed in the radome inner wall above the transmitting antenna 530*a* as illustrated in FIG. 12C may be used as the integrated transceiving radome 95 of a related art.

Figure 13:
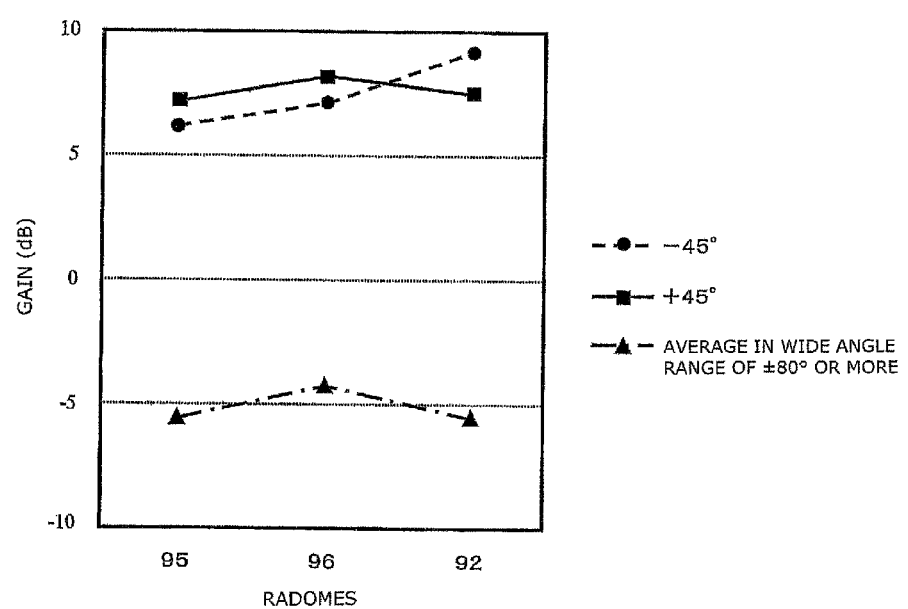
FIG. 13 is a graph illustrating a gain comparison when radome of a comparative example is used.

However, it is possible to improve the gain of the transmitting antenna 530*a* in the direction of ±45° using the integrated transceiving radome 96, but there is a problem in that the high gain is obtained even in a wide angle direction in which the gain is desired to be reduced, for example, in a wide angle direction of ±80° or more. On the other hand, in the radome 92 illustrated in FIG. 12A, it is possible to obtain the high gain of the transmitting antenna 530*a* in the direction of ±45° and reduce the gain in the wide angle direction of ±80° or more. FIG. 13 illustrates a comparison of the gain of the transmitting antenna 530*a* in the direction of ±45° and a gain average value of a wide angle range of ±80° or more (−180° to −80° and +80° to +180°) when the radomes 92, 95, and 96 illustrated respectively in FIGS. 12A, 12B and 12C are used.

As illustrated in FIG. 13, when the integrated transceiving radome 95 of the related art is used, it is possible to reduce the gain in the wide angle range of ±80° or more, but the gain in the direction of ±45° is also low. Further, when the integrated transceiving radome 96 with the shape of the radome inner wall similar to the radome 120 of the second embodiment is used for the integrated transceiving radome of the related art, it is possible to obtain the high gain in the direction of ±45°, but the gain in the wide angle range of ±80° or more is also increased. On the other hand, when the radome 92 having a similar shape as the radome 120 of the second embodiment in which only the transmitting antenna 530*a* is covered is used, it is possible to obtain the high gain in the direction of ±45° and reduce the gain in the wide angle range of ±80° or more.

Figure 11A:
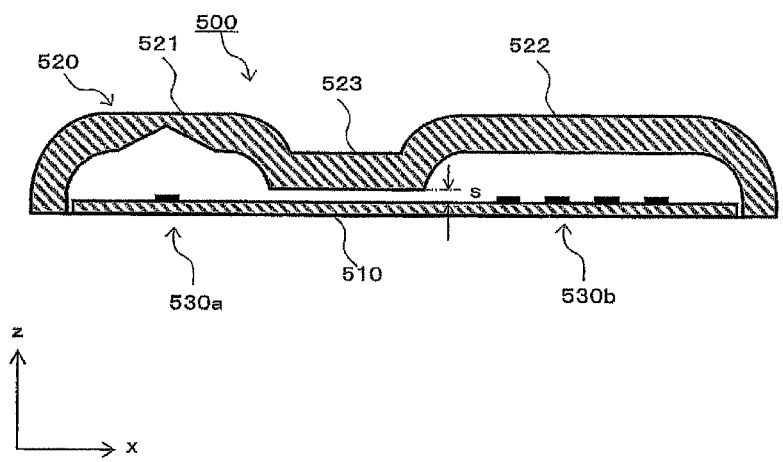
FIG. 11A is a cross-sectional view and FIG. 11B is a perspective view both illustrating a configuration of an antenna apparatus according to a fifth embodiment of the invention.
Figure 11B:
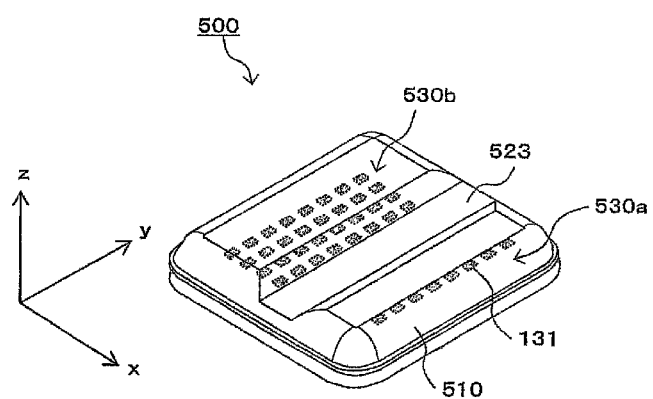

In an integrated transceiving radome 520 of the present embodiment illustrated in FIGS. 11A and 11B, the radome 120 of second embodiment is applied to a radome portion 521 covering the transmitting antenna 530*a* and integrated with a radome portion 522 covering the receiving antenna 530*b*. Here, any one of the radomes 220, 120, and 320 of the first to third embodiments is applied only to the radome portion 521 covering the transmitting antenna 530*a*, but the invention is not limited thereto and may be applied to the radome portion 522 covering the receiving antenna 530*b* or may be applied to both radome portions.

Figure 14:
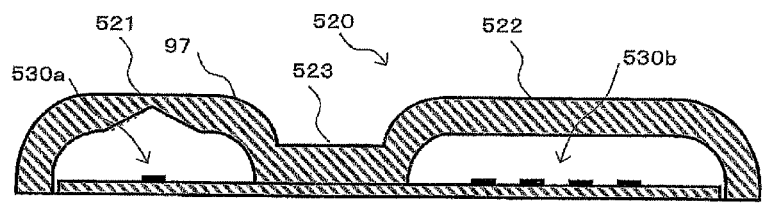
FIG. 14 is a cross-sectional view illustrating another example of the radome of the integrated transceiving antenna.

FIG. 14 illustrates an integrated transceiving radome in which the radomes 92 and 93 illustrated in FIG. 12A are simply connected and integrated. In an integrated transceiving radome 97 illustrated in FIG. 14, the radome 92 and 93 illustrated in FIG. 12A are simply connected by the same material, and a space covering the transmitting antenna 530*a* and a space covering the receiving antenna 530*b* are isolated. Even when the integrated transceiving radome 97 is used, there arises a problem in that the gain of the transmitting antenna 530*a* in the direction of ±45° is decreased, and the unnecessary gain in the wide angle direction is increased.

Figure 15:
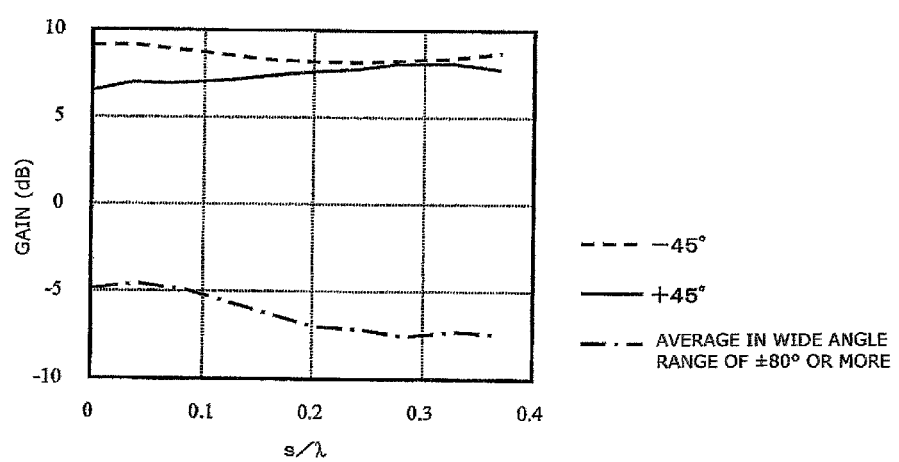
FIG. 15 is a graph illustrating a change in a gain with respect to an interval width between a connecting portion of a radome according to the fifth embodiment and a circuit substrate.

In this regard, in an integrated transceiving radome 520 of the antenna apparatus 500 of the present embodiment illustrated in FIGS. 11A and 11B, a connecting portion 523 that connects the transmitting antenna side radome portion 521 with the receiving antenna side radome portion 522 is formed to have an interval of a width s between the connecting portion 523 and the circuit substrate 510. FIG. 15 illustrates an example of the change in the gain of the transmitting antenna 530*a* when the width s of the interval between the connecting portion 523 and the circuit substrate 510 is changed. FIG. 15 illustrates a change in each gain when the interval width s is changed where a horizontal axis indicates a value of s/λ obtained by normalizing the interval width s between the connecting portion 523 and the circuit substrate 510 using the free space wavelength λ, and a vertical axis indicates the gain of the transmitting antenna 530*a* in the direction of ±45° and the gain average value in the wide angle range of ±80° or more.

In FIG. 15, when s/λ=0, that is, when s=0, it corresponds to the integrated transceiving radome 97 illustrated in FIG. 14. As can be seen from FIG. 15, there is a problem in that in the integrated transceiving radome 97 having no interval between the connecting portion 523 and the circuit substrate 510, a difference between the gain in the direction of −45° and the gain in the direction of +45° is increased and become asymmetric. Further, there is also a problem that the unnecessary gain in the wide angle region of ±80° or more is increased. On the other hand, when an interval is formed between the connecting portion 523 and the circuit substrate 510 to increase the width s, the gain in the direction of −45° and the gain in the direction of +45° are substantially equal, so that symmetry is obtained, and also the unnecessary gain in the wide angle region of ±80° or more is decreased.

It is desirable to set the interval width s to be λ/8 or more in accordance with the change in the gain with respect to s/λ illustrated in FIG. 15, and at this time, the gain in the direction of −45° and the gain in the direction of +45° are substantially symmetric, and a high value is obtained, and it is possible to reduce the unnecessary gain in the wide angle range of ±80° or more.

Figure 16:
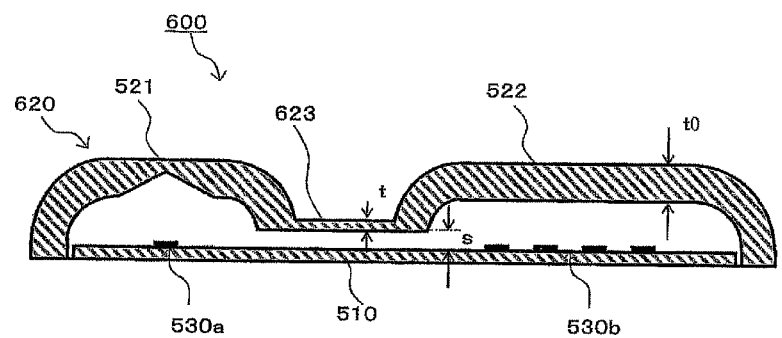
FIG. 16 is a cross-sectional view illustrating a configuration of an antenna apparatus according to a sixth embodiment of the invention.

An antenna apparatus according to the sixth embodiment of the invention will be described with reference to FIG. 16. FIG. 16 is a cross-sectional view of the antenna apparatus 600 of the present embodiment. An integrated transceiving radome 620 of an antenna apparatus 600 according to the present embodiment includes a connecting portion 623 having a different shape from the connecting portion 523 of the integrated transceiving radome 520 included in the antenna apparatus 500 of the fifth embodiment. The connecting portion 623 is formed to have an interval of a width s of λ/8 or more between the connecting portion 623 and the circuit substrate 510, similarly to the connecting portion 523 of the fifth embodiment but has a different thickness from the connecting portion 523.

Figure 17:
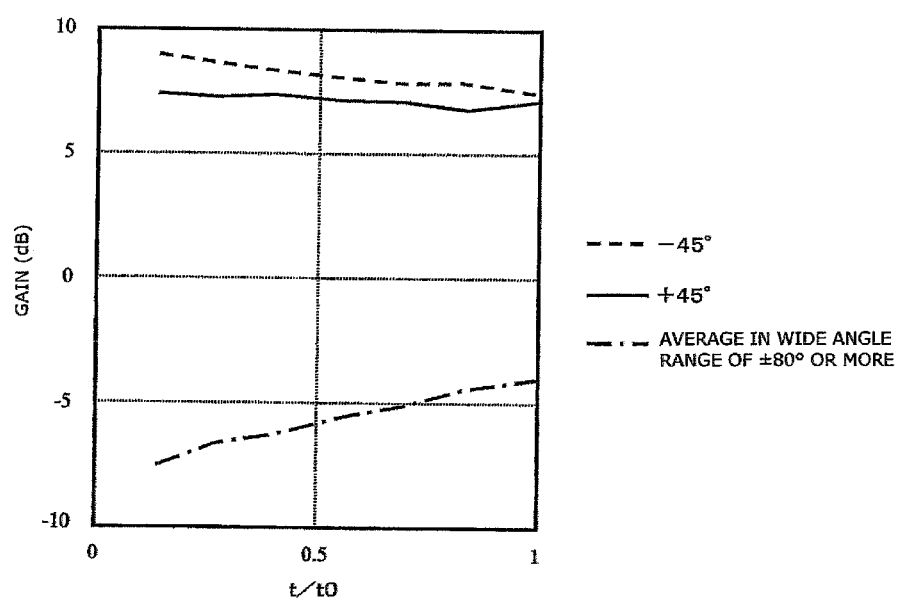
FIG. 17 is a graph illustrating a change in a gain with respect to a thickness of a connecting portion of a radome according to the sixth embodiment.

In the connecting portion 623 connecting the transmitting antenna side radome portion 521 with the receiving antenna side radome portion 522, the interval width s between the connecting portion 623 and the circuit substrate 510 has influence on the gain of the transmitting antenna 530a as described above, and the thickness of the connecting portion 623 has influence on the gain of transmitting antenna 530a. FIG. 17 illustrates an example of the change in the gain of the transmitting antenna 530a when the thickness of the connecting portion 623 is indicated by t, and the thickness t is changed. Here, the thickness of the receiving antenna side radome portion 522 is set as a reference radome thickness t0.

The thickness of the receiving antenna side radome portion 522 is generally decided on the basis of a ½ wavelength radome design technique so that a reception characteristic of the receiving antenna 530b is optimal. If a dielectric constant of a radome material used for the integrated transceiving radome 620 is indicated by ε, the thickness t0 of the receiving antenna side radome portion 522 is obtained by $\lambda/2\sqrt{\varepsilon}$ in the ½ wavelength radome design technique. The thickness of the connecting portion 523 of the fifth embodiment is formed to be substantially equal to the reference radome thickness t0.

In FIG. 17, a horizontal axis indicates a value of t/t0 obtained by normalizing the thickness t of the connecting portion 623 using the reference radome thickness t0, and a vertical axis indicates the gain of the transmitting antenna 530a in the direction of ±45° and the gain average value in the wide angle range of ±80° or more. As can be seen from FIG. 17, as the thickness t of the connecting portion 623 is decreased, the unnecessary gain in the direction of ±80° is decreased. Further, it is understood that the gain in the direction of ±45° is slightly increased. It is desirable that the thickness t of the connecting portion 623 be ⅔ or less of the reference radome thickness t0 in which the unnecessary gain in the wide angle range of ±80° or more is −5 dB or less.

As described above, in all the antenna apparatuses according to the first to sixth embodiments of this invention, it is possible to increase the gain in the direction of ±45° in which the high gain is necessary and decrease the unnecessary gain in the wide angle direction, and it is possible to implement the low-height (compact) radome.

The description in the present embodiment relates to an example of the antenna apparatus according to the invention, and the invention is not limited thereto. A detailed configuration, a detailed operation, and the like of the antenna apparatus according to the present embodiment can be appropriately changed with the scope not departing from the gist of the invention.

EXPLANATIONS OF LETTERS OR NUMERALS 100, 200, 300, 400, 500, 600 antenna apparatus
110, 510 circuit substrate
120, 220, 320, 420 radome
121, 221, 321 thin wall point
122, 123, 222, 223, 322, 323 thick wall point
130 patch array antenna
131 patch antenna element
324 sidewall
425 end portion
520, 620 integrated transceiving radome
521 transmitting antenna side radome portion
522 receiving antenna side radome portion
523, 623 connecting portion
530a transmitting antenna
530b receiving antenna

The invention claimed is:

1. An antenna apparatus, comprising:
a circuit substrate;
a patch array antenna including an element array and having a free space wavelength of λ, the element array including a line of two or more patch antenna elements;
a radome having an inner wall and configured to house the patch array antenna and the circuit substrate,
wherein, when a plane passing through a center of each of the patch antenna elements of the patch array antenna and vertical to the circuit substrate is a radiation vertical surface,
the inner wall of the radome further includes a first region in which a cross-sectional radome thickness is smaller than the cross-sectional radome thickness of a second region, the first region whose corresponding angle with respect to a radiation vertical surface when viewed from the center of the patch array antenna is larger than −50° and smaller than +50° while the second region whose corresponding angle with respect to a radiation vertical surface when viewed from the center of the patch array antenna is equal to or smaller than −50° and equal to or larger than +50%,
wherein the radome is formed such that an end portion of the radome is vertical to the circuit substrate, and a distance from a center of the patch array antenna to a center of the end portion in a thickness direction is 0.85λ or more and 1.15λ or less.

2. The antenna apparatus according to claim 1,
wherein the inner wall of the radome is formed such that a radome thickness at an intersecting position which intersects with the radiation vertical surface is smallest, and a region from the intersecting position to a position at which an angle with respect to the radiation vertical surface is ±50° has a flat shape.

3. The antenna apparatus according to claim 1,
wherein the inner wall of the radome is formed in a curved shape being convex toward the patch array antenna from a position that intersects with the radiation vertical surface to a position at which an angle with respect to the radiation vertical surface is ±50°.

4. The antenna apparatus according to claim 1,
wherein the patch array antenna further includes
a transmitting antenna having a line of element arrays and a
receiving antenna having one or more lines of element arrays,
the radome further includes an integrated transceiving radome including a transmitting antenna side radome portion configured to accommodate the transmitting antenna, a receiving antenna side radome portion configured to accommodate the receiving antenna, and a connecting portion connecting the transmitting antenna side radome portion with the receiving antenna side radome portion,
wherein at least one of the transmitting antenna side radome portion and the receiving antenna side radome portion contains the first region and the second region, and
an interval of λ/8 or more is formedbetween the connecting portion and the circuit substrate.

5. The antenna apparatus according to claim 2, wherein the
patch array antenna further includes a
transmitting antenna having a line of element arrays and a receiving antenna having one or more lines of element arrays,
  the radome further includes an integrated transceiving radome including a transmitting antenna side radome portion configured to accommodate the transmitting antenna, a receiving antenna side radome portion configured to accommodate the receiving antenna, and a connecting portion connecting the transmitting antenna side radome portion with the receiving antenna side radome portion,
  wherein at least one of the transmitting antenna side radome portion and the receiving antenna side radome portion contains the first region and the second region, and an interval of $\lambda/8$ or more is formed between the connecting portion and the circuit substrate.

6. The antenna apparatus according to claim 3,
  wherein the patch array antenna further includes a transmitting antenna having a line of element arrays and a receiving antenna having one or more lines of element arrays,
  the radome further includes an integrated transceiving radome including a transmitting antenna side radome portion configured to accommodate the transmitting antenna, a receiving antenna side radome portion configured to accommodate the receiving antenna, and a connecting portion connecting the transmitting antenna side radome portion with the receiving antenna side radome portion,
  wherein at least one of the transmitting antenna side radome portion and the receiving antenna side radome portion contains the first region and the second region, and an interval of $\lambda/8$ or more is formed between the connecting portion and the circuit substrate.

7. The antenna apparatus according to claim 4,
  wherein, when a cross-sectional thickness of the receiving antenna side radome portion is a reference radome thickness, the connecting portion has a thickness of ⅔ or less of the reference radome thickness.

8. The antenna apparatus according to claim 5,
  wherein, when a cross-sectional thickness of the receiving antenna side radome portion is a reference radome thickness, the connecting portion has a thickness of ⅔ or less of the reference radome thickness.

9. The antenna apparatus according to claim 6,
  wherein, when a cross-sectional thickness of the receiving antenna side radome portion is a reference radome thickness, the connecting portion has a thickness of ⅔ or less of the reference radome thickness.

* * * * *